United States Patent Office 2,889,325
Patented June 2, 1959

2,889,325
DERIVATIVES OF 1,3(2H)-DIOXO-1-PYRAZOLO[a]-BENZO[c]CINNOLINE

Rudolf Pfister and Franz Häfliger, Basel, Switzerland, assignors to Geigy Chemical Corporation, New York, N.Y., a corporation of Delaware No Drawing. Application June 2, 1958
Serial No. 738,923

Claims priority, application Switzerland June 7, 1957

5 Claims. (Cl. 260—250)

The present invention concerns therapeutically valuable 2-substituted 1,3(2H)-dioxo-1-pyrazolo[a]benzo[c]-cinnolines as well as processes for the production thereof.

It has been found that 2-acyl-1.3(2H)-dioxo-1-pyrazolo[a]benzo[c]cinnolines of the general formula

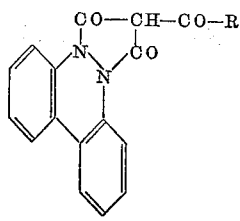

I wherein R is a member selected from the group consisting of a lower alkyl radical, a phenyl radical and a benzyl radical,
or the tautomeric forms thereof can be produced by reacting, possibly in the presence of a condensing agent, a reactive functional derivative of a carboxylic acid of the general formula

R—COOH    II with the 1.3(2H)-dioxo-1-pyrazolo[a]benzo[c]cinnoline of the formula

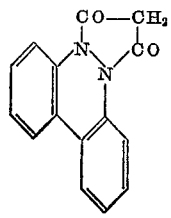

III

For example a carboxylic acid halide or anhydride can be reacted in the presence of pyridine or another tertiary organic base, or in the presence of a Friedel-Crafts condensing agent such as aluminium chloride, with a compound of the general Formula III. The reactions are performed advantageously in inert organic solvents such as, for example, chloroform or benzene.

The new compounds produced according to the present invention have therapeutically valuable properties, in particular antiphlogistic, antipyretic and analgetic activity. They can be used advantageously for the treatment of fever conditions.

Examples of starting materials of the general Formula II are aceticanhydride, benzoic acid anhydride as well as the chlorides and bromides of propionic acid, butyric acid, isobutyric acid, valeric acid, isovaleric acid, caproic acid, pivalic acid, phenylacetic acid, and benzoic acid.

The starting material of the Formula III is produced for example by condensation of 5.6-dihydro-benzo[c]-cinnoline with malonic acid dialkylesters by heating in the presence of alkaline condensing agents such as, for example, sodium alcoholates, advantageously in organic solvents such as alcohols or benzene hydrocarbons, as well as possibly while continually distilling off the alcohol liberated in the reaction.

Most of the new 2-acyl-1.3(2H)-dioxo-1-pyrazolo[a]-benzo[c]cinnolines are pale coloured crystallised substances. With inorganic and organic bases they form, probably in a tautomeric enol form, salts some of which are difficultly soluble in water.

The following examples further illustrate the production of the new compounds. Parts are given as parts by weight and their relationship to parts by volume is as that of grammes to cubic centimetres. The temperatures are in degrees centigrade.

Example 1

2 parts by volume of abs. pyridine are added to the solution of 5 parts of 1.3(2H)-dioxo-1-pyrazolo[a]-benzo[c]cinnoline in 170 parts by volume of abs. chloroform and then a solution of 1.57 parts by volume of acetyl chloride in 16 parts by volume of abs. chloroform is added dropwise at 5–12° while stirring. After stirring for 6 hours at room temperature, the reaction mixture is stirred into 100 parts by volume of ice water. The organic phase is removed, shaken out twice with 50 parts by volume of 0.5 N-hydrochloric acid each time to remove the pyridine and then extracted three times with 50 parts by volume of 0.5 N-potassium bicarbonate solution each time. Crystals of the difficultly soluble potassium salt of 2-acetyl-1.3(2H)-dioxo-1-pyrazolo[a]benzo-[c]cinnoline are formed in the potassium bicarbonate solutions. These are filtered off under suction, dissolved in 2000 parts by volume of water at 60°, the solution is filtered through a charcoal filter and made acid to Congo red paper. The reaction product separates in the form of yellow crystals which are filtered off under suction, washed neutral with water, dried, and recrystallised from ethyl acetate. The 2-acetyl-1.3(2H)-dioxo-1-pyrazolo[a]ben-zo[c]cinnoline melts at 148° on decomposition. On using 2.24 parts of acetic anhydride instead of acetyl chloride, one can proceed in an analogous manner.

Example 2

2 parts by volume of abs. pyridine are added to a solution of 5 parts of 1.3(2H)-dioxo-1-pyrazolo[a]benzo[c]-cinnoline in 170 parts by volume of abs. chloroform and at 0–10° a solution of 2.52 parts by volume of benzoyl chloride in 17 parts by volume of abs. chloroform is added while stirring. The reaction mixture is then stirred for 12 hours at room temperature. It is then stirred into 100 parts by volume of ice water, the organic phase is separated, shaken out twice with 50 parts by volume of 1 N-hydrochloric acid each time, dried and concentrated. The residue can be recrystallised direct from ethyl acetate. The 2-benzoyl-1.3(2H)-dioxo-1-pyrazolo[a]benzo[c]cinnoline melts at 176°. That this is the C-benzoyl compound and not the enol benzoate can be proved by dividing a sample between ethyl acetate and diluted sodium carbonate solution. The sodium salt formed is dissolved in the ethyl acetate. On concentrating the solution it crystallises out. The melting point is not clear but is in the region of 250°. The sodium content corresponds to the theoretical amount.

Example 3

On using 3.39 parts of phenylacetyl chloride, the 2-phenylacetyl - 1.3(2H)-dioxo - 1-pyrazolo[a]benzo[c]cin-noline is obtained in a manner analogous to that described in Example 2. Recrystallised from ethyl acetate, it melts at 174°.

Example 4

On using 2.1 parts of butyryl chloride, the 2-butyryl-1.3(2H)-dioxo-1-pyrazolo[a]benzo[c]cinnoline is obtained also in a manner analogous to that described in Example 2. Recrystallised from ethyl acetate it melts at 122°. This compound can be extracted from a chloroform solution in the usual way with diluted sodium bicarbonate solution, i.e. its sodium salt remains dissolved in the aqueous phase. However, similarly to the compounds of the previous examples, it forms salts with most cations, which salts also have only relatively slight water solubility.

Example 5

3.39 parts of phenylacetylchloride in 17 parts by volume of abs. chloroform are added dropwise at 0–10° to the mixture of 5 parts of 1.3(2H)-dioxo-1-pyrazolo-[a]benzo[c]cinnoline, 170 parts by volume of abs. chloroform and 8 parts of aluminium chloride. The reaction mixture is then stirred for 12 hours at approx. 25° and then worked up as described in Example 2. The 2-phenylacetyl-1.3(2H)-dioxo-1-pyrazolo[a]benzo[c]cinnoline is recrystallised from ethyl acetate and melts at 174°.

What we claim is:

1. 2-acyl-1.3(2H)dioxo-1-pyrazolo[a]benzo[c]cinnolines of the general formula

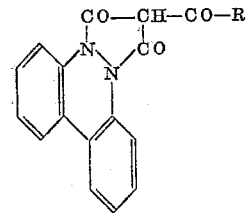

I wherein R is a member selected from the group consisting of a lower alkyl radical, a phenyl radical and a benzyl radical.

2. 2-acetyl-1.3(2H)-dioxo-1-pyrazolo[a]benzo[c]-cinnoline.

3. 2-butyryl-1.3(2H)-dioxo-1-pyrazolo[a]benzo[c]-cinnoline.

4. 2-benzoyl-1.3(2H)-dioxo-1-pyrazolo[a]benzo[c]-cinnoline.

5. 2-phenyl-acetyl-1.3(2H)-dioxo-1-pyrazolo[a]benzo[c]cinnoline.

No references cited.